(12) United States Patent
Chang (10) Patent No.: US 11,213,167 B2
(45) Date of Patent: Jan. 4, 2022

(54) DETACHABLE PLATFORM FOR A BARBECUE GRILL

(71) Applicant: REVOACE INC. LIMITED, Taichung (TW)

(72) Inventor: Shu-Jui Chang, Taichung (TW)

(73) Assignee: REVOACE INC. LIMITED, Taichung (TW)

( * ) Notice: Subject to any disclaimer, the term of this patent is extended or adjusted under 35 U.S.C. 154(b) by 267 days.

(21) Appl. No.: 16/532,483

(22) Filed: Aug. 6, 2019

(65) Prior Publication Data
US 2021/0038023 A1  Feb. 11, 2021

(51) Int. Cl.
*A47J 37/07* (2006.01)
(52) U.S. Cl.
CPC ....... *A47J 37/0786* (2013.01); *A47J 37/0704* (2013.01); *A47J 2037/0795* (2013.01)

(58) Field of Classification Search
CPC .................................................. A47J 37/0786
See application file for complete search history.

(56) References Cited

U.S. PATENT DOCUMENTS

2018/0187895 A1* 7/2018 DeMars .................... F24B 3/00

* cited by examiner

*Primary Examiner* — Jason Lau
(74) *Attorney, Agent, or Firm* — Bruce Stone LLP; Joseph A. Bruce (57) ABSTRACT

A barbecue grill includes a bowl, a platform, a bracket connected to the bowl, and a coupler connected to the platform and used to engage with the bracket in a detachable manner. A positioning rod is formed on the bracket, and a guiding slit is made in the coupler. The positioning rod is movable in the guiding slit. A restraining aperture is made in the bracket, and a latch is formed on the coupler and movable between an extended position and a withdrawn position. In the extended position, the latch can be inserted in the restraining aperture to engage the coupler with the bracket to keep the platform on the bowl.

10 Claims, 10 Drawing Sheets

DETACHABLE PLATFORM FOR A BARBECUE GRILL

BACKGROUND OF INVENTION

1. Field of Invention

The present invention relates to a barbecue grill and, more particularly, to a detachable platform for a barbecue grill.

2. Related Prior Art

A typical barbecue grill includes a bowl, a support structure and two platforms. The bowl is supported on the support structure. The platforms are connected to two opposite sides of the support structure. The bowl, the support structure and the platform are made of metal typically. Therefore, the bowl, the support structure and the platform are connected to one another by screws, rivets or welding for example. However, the bowl, the support structure and the platform cannot easily be detached from one another for cleaning, maintenance or replacement.

The present invention is therefore intended to obviate or at least alleviate the problems encountered in prior art.

SUMMARY OF INVENTION

It is the primary objective of the present invention to provide a barbecue grill with a detachable platform.

To achieve the foregoing objective, the barbecue grill includes a bowl, a bracket connected to the bowl, and a coupler connected to the platform and used to engage with the bracket in a detachable manner. A positioning rod is formed on the bracket, and a guiding slit is made in the coupler. The positioning rod is movable in the guiding slit. A restraining aperture is made in the bracket, and a latch is formed on the coupler and movable between an extended position and a withdrawn position. In the extended position, the latch can be inserted in the restraining aperture to engage the coupler with the bracket to keep the platform on the bowl.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Figure 1:
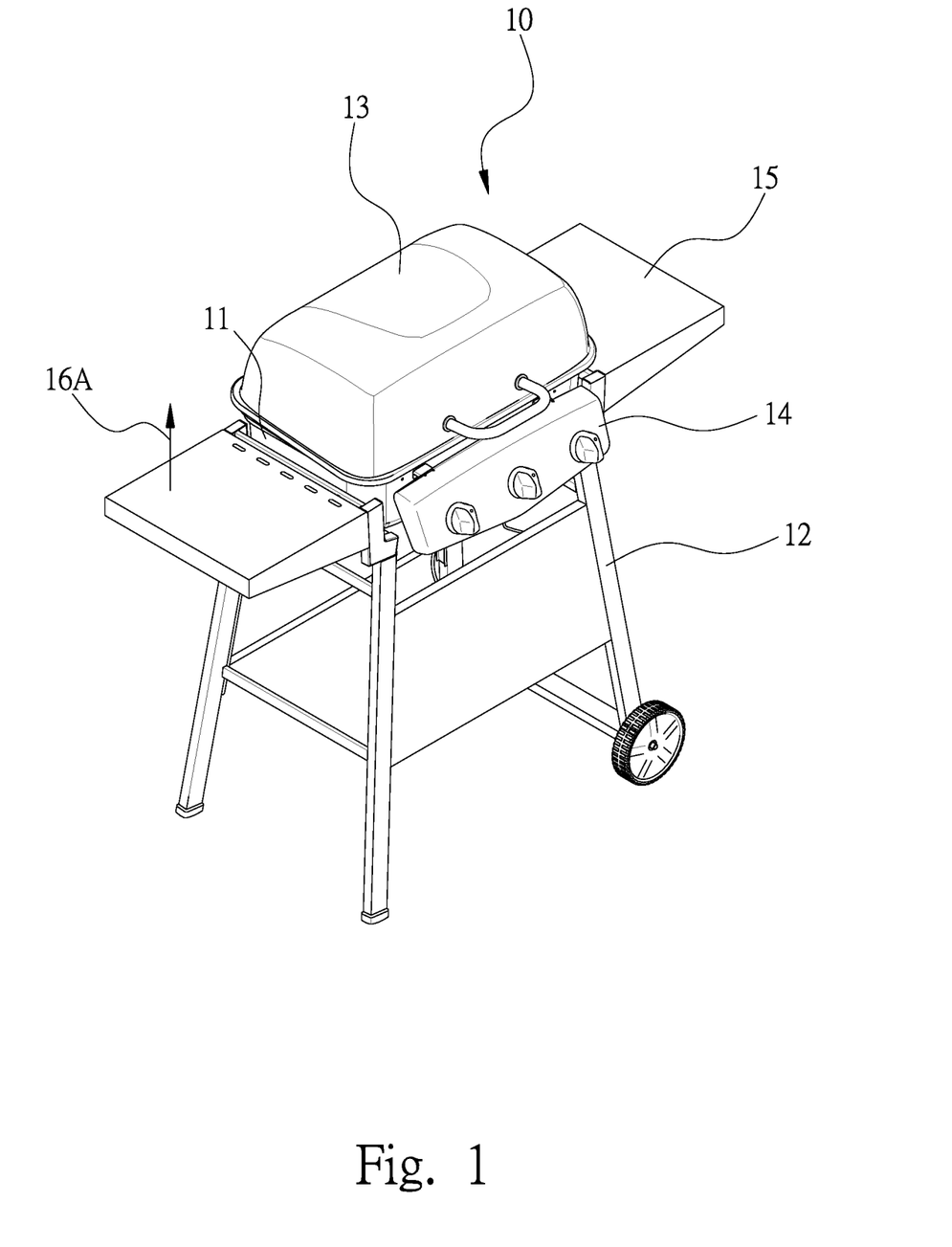
FIG. 1 is a perspective view of a barbecue grill with two detachable platforms according to the first embodiment of the present invention.

Referring to FIG. 1, a barbecue grill 10 includes a bowl 11, a support structure 12, a cover 13, a control panel 14 and two platforms 15 according to a first embodiment of the present invention. The bowl 11 is supported on the support structure 12 so that the bowl 11 is placed at a proper height above a floor. Preferably, the support structure 12 is in the form of a cart. Preferably, the cover 13 is pivotally connected to the bowl 11. Thus, the cover 13 can be laid on the bowl 11 to cover and protect food. The cover 13 can be lifted from the bowl 11 to feed food into the bowl 11. The control panel 14 is connected to a front portion of the bowl 11. The control panel 14 is operable to ignite and adjust temperature for cooking. Each of the platforms 15 is connected to a lateral side of the bowl 11. The platforms 15 can be detached from the bowl 11 in a sense of direction indicated by an arrow head 16A.

Figure 2:
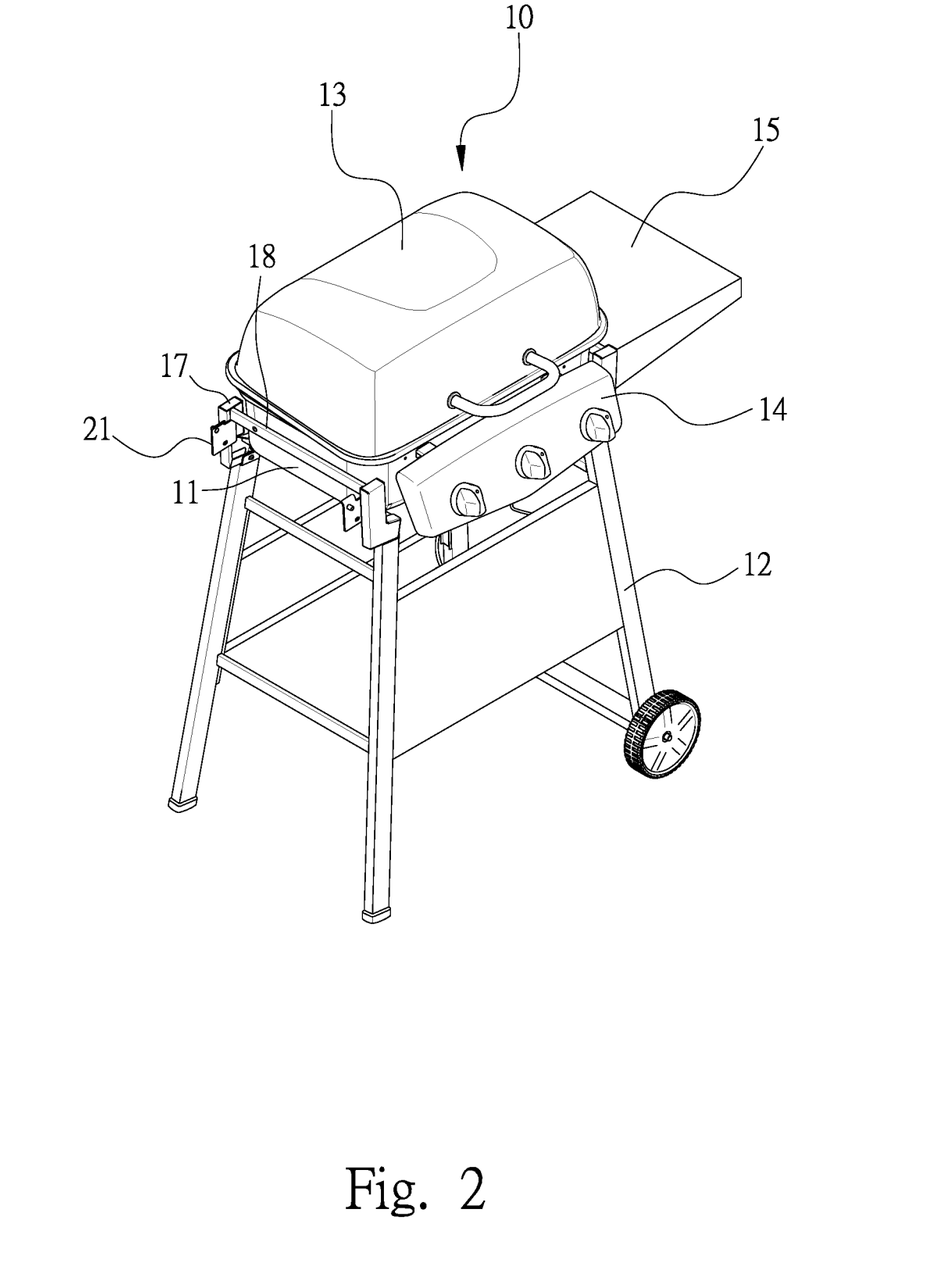
FIG. 2 is a perspective view of the barbecue grill shown in FIG. 1 with one of the detachable platforms removed.

Referring to FIG. 2, one of the platforms 15 is detached from the bowl 11. The following description will be given to only one of the platforms 15 for briefness and clarity.

The barbecue grill 10 includes two connectors 17, a crossbar 18 and two brackets 21. The connectors 17 are connected to the bowl 11 by welding for example. The crossbar 18 is located between and connected to the connectors 17 to reinforce rigidity of the connectors 17. Each of the brackets 21 is connected to a corresponding one of the connectors 17. Thus, the brackets 21 are separated from each other.

Figure 3:
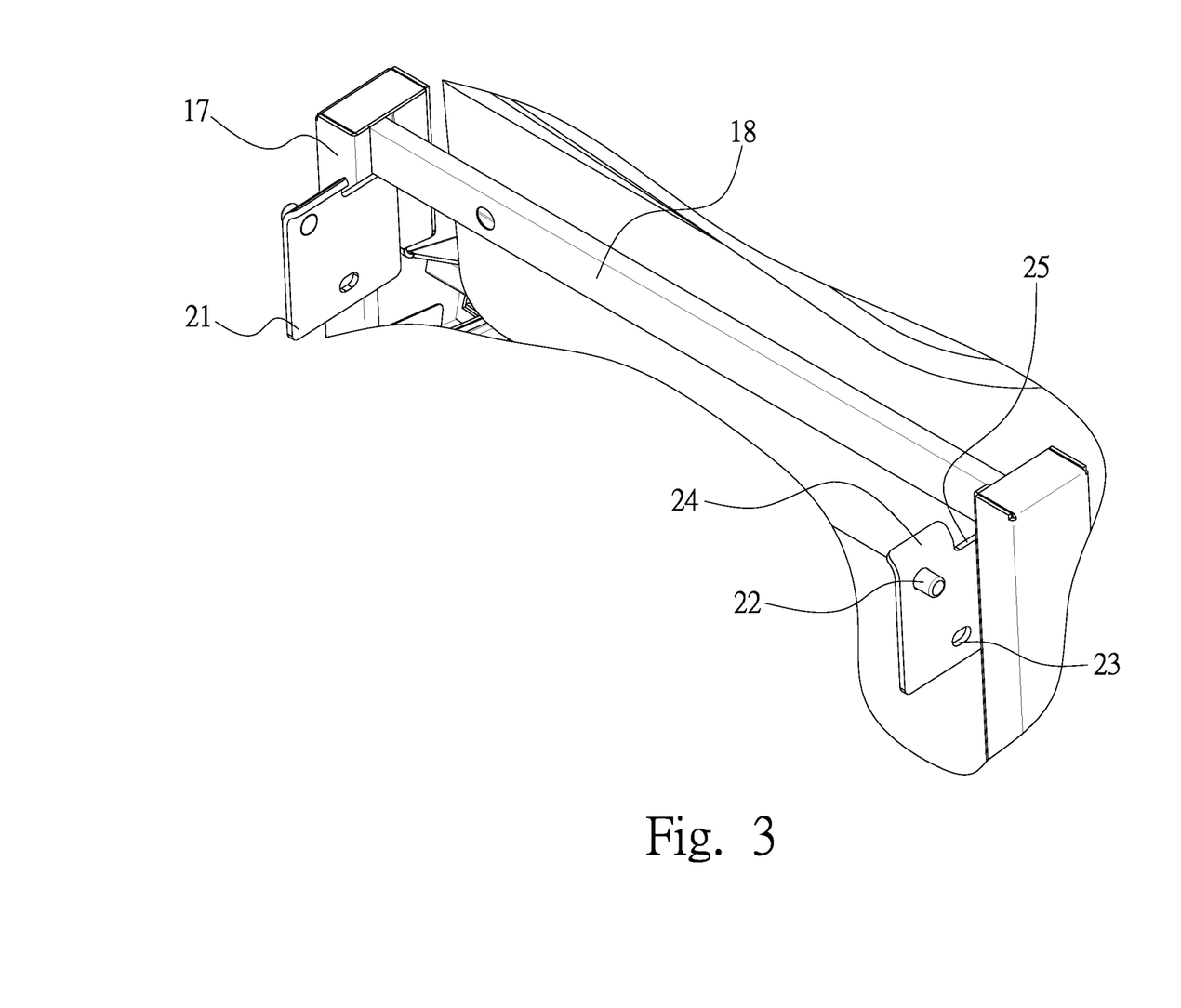
FIG. 3 is an enlarged partial view of the barbecue grill shown in FIG. 2.

Referring to FIG. 3, each of the brackets 21 is substantially in the form of a plate and includes a positioning rod 22 extending from a side, a restraining aperture 23 and a guiding strip 24 extending from an upper edge 25. The positioning rods 22 of the brackets 21 extend away from each other. The restraining aperture 23 of each of the brackets 21 is preferably a slot in the vicinity of a lower edge (not numbered) of each of the brackets 21. The guiding strips 24 of the brackets 21 are arched and extend toward each other.

Figure 4:
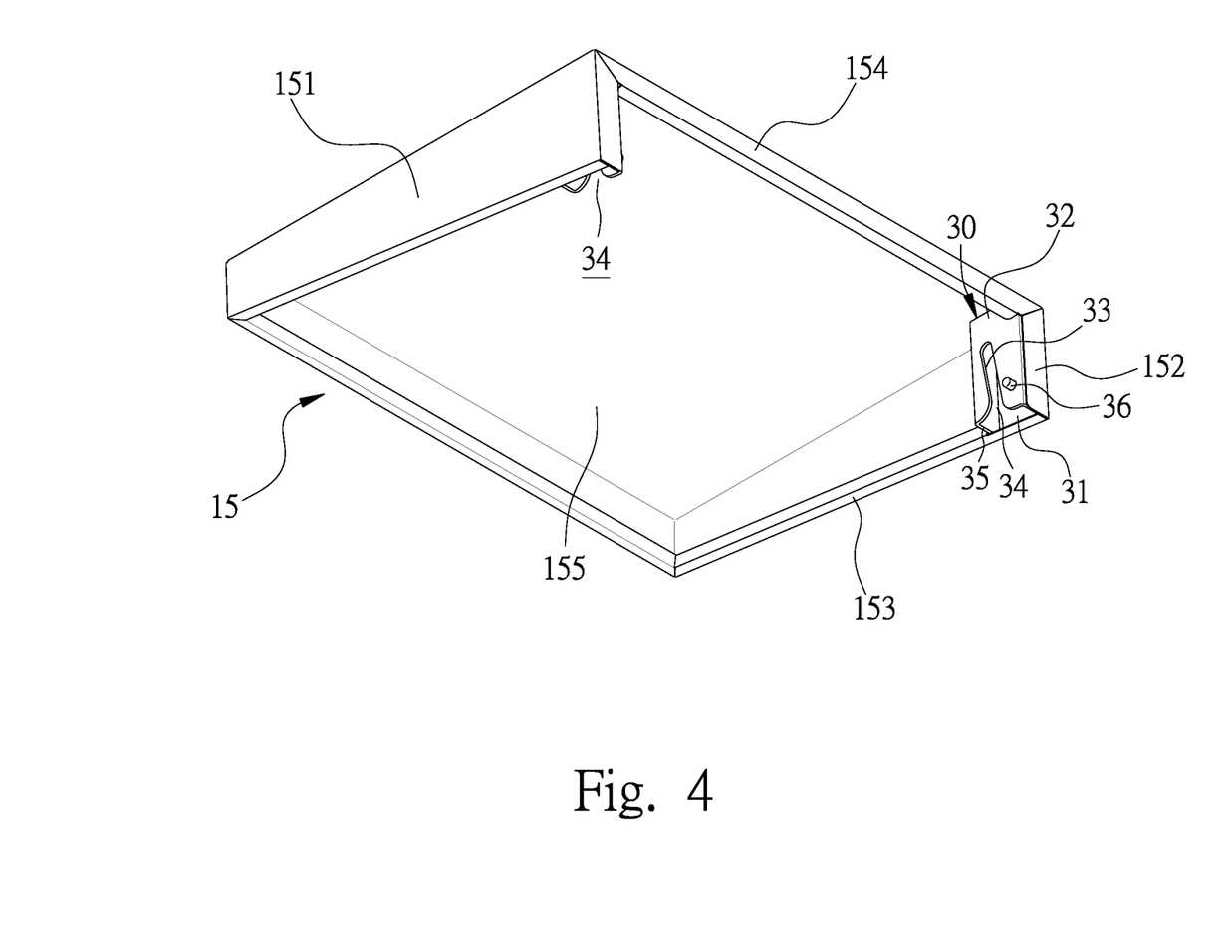
FIG. 4 is an enlarged view of one of the detachable platforms shown in FIG. 1.

Referring to FIG. 4, the platform 15 includes a board 155, two major skirts 151, two vertical strips 152 and two minor skirts 154. The major and minor skirts 151 and 154 extend from a lower face of the board 155. Each of the major and minor skirts 151 and 154 includes a flat lower edge 153 so that the lower edges 153 will not cut a user who is operating the plat form 15. Each of the vertical strips 152 extends from a corresponding one of the major skirts 151. For convenience of the following description, one of the major skirts 151 can be referred to as the "front skirt 151", the other major skirt 151 the "rear skirt 151", one of the minor skirts 154 can be referred to as the "internal skirt 154" and the other minor skirt 154 the "external skirt 154" for their positions relative to the bowl 11 in operation.

Two couplers 30 are connected to the platform 15. Each of the couplers 30 is made by bending a metal strip into three portions. i.e., a primary portion 32 formed between two secondary portions 35. The secondary portions 35 extend from the primary portion 32 at the right angle. For convenience of the following description, one of the couplers 30 can be referred to as the "front coupler 30" and the other coupler 30 the "rear coupler 30." By welding for example, one of the secondary portions 35 of the front coupler 30 is connected to the front skirt 151 and the other secondary portion 35 of the front coupler 30 is connected to a corresponding one of the vertical strips 152. By welding for example, one of the secondary portions 35 of the rear coupler 30 is connected to the rear skirt 151 and the other secondary portion 35 of the rear coupler 30 is connected to a corresponding one of the vertical strips 152. Thus, the front coupler 30 and a portion of the front skirt 151 together form a front socket 31. The rear coupler 30 and a portion of the rear skirt 151 together form a front socket. The primary portion 32 of each of the couplers 30 includes a guiding slit 33. The guiding slit 33 is a rectilinear slit in this embodiment. The guiding slit 33 includes a closed end (not numbered) and an open end 34. The closed end is located higher than the open end 34.

Figure 5:
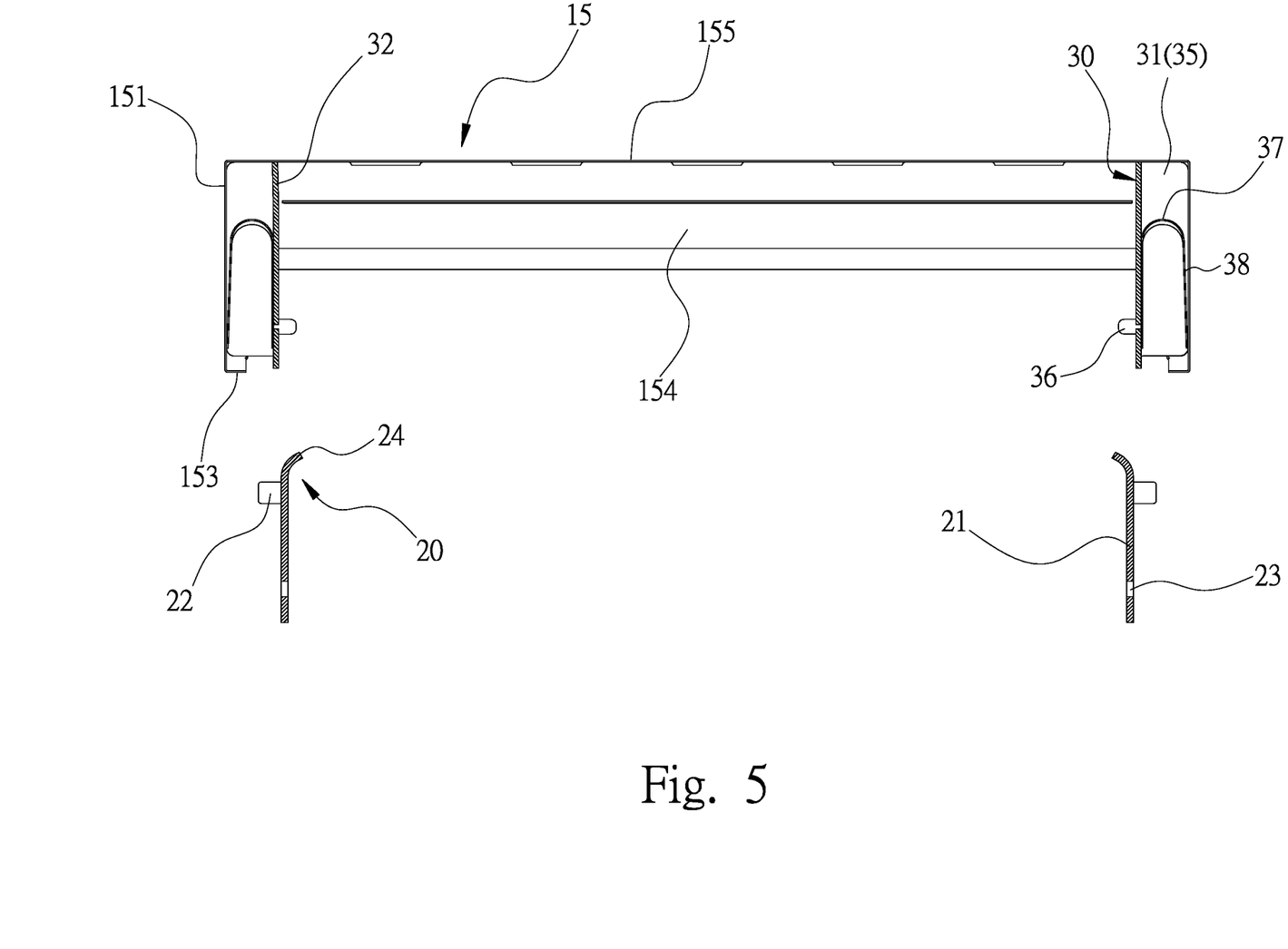
FIG. 5 is another enlarged partial view of the barbecue grill shown in FIG. 2.

Referring to FIG. 5, each of the sockets 31 contains a latch 36 and a leaf spring 37. The leaf spring 37 includes an arched portion formed between two rectilinear contact portions 38. The latch 36 extends from one of the contact portions 38. The contact portion 38 is located on the primary portion 32 of the corresponding coupler 30, and the other contact portion 38 is connected to the portion of the corresponding skirt 151. The leaf spring 37 biases the latch 36 out of the corresponding socket 31 through an aperture (not numbered) in the primary portion 32 of the corresponding coupler 30.

Figure 6:
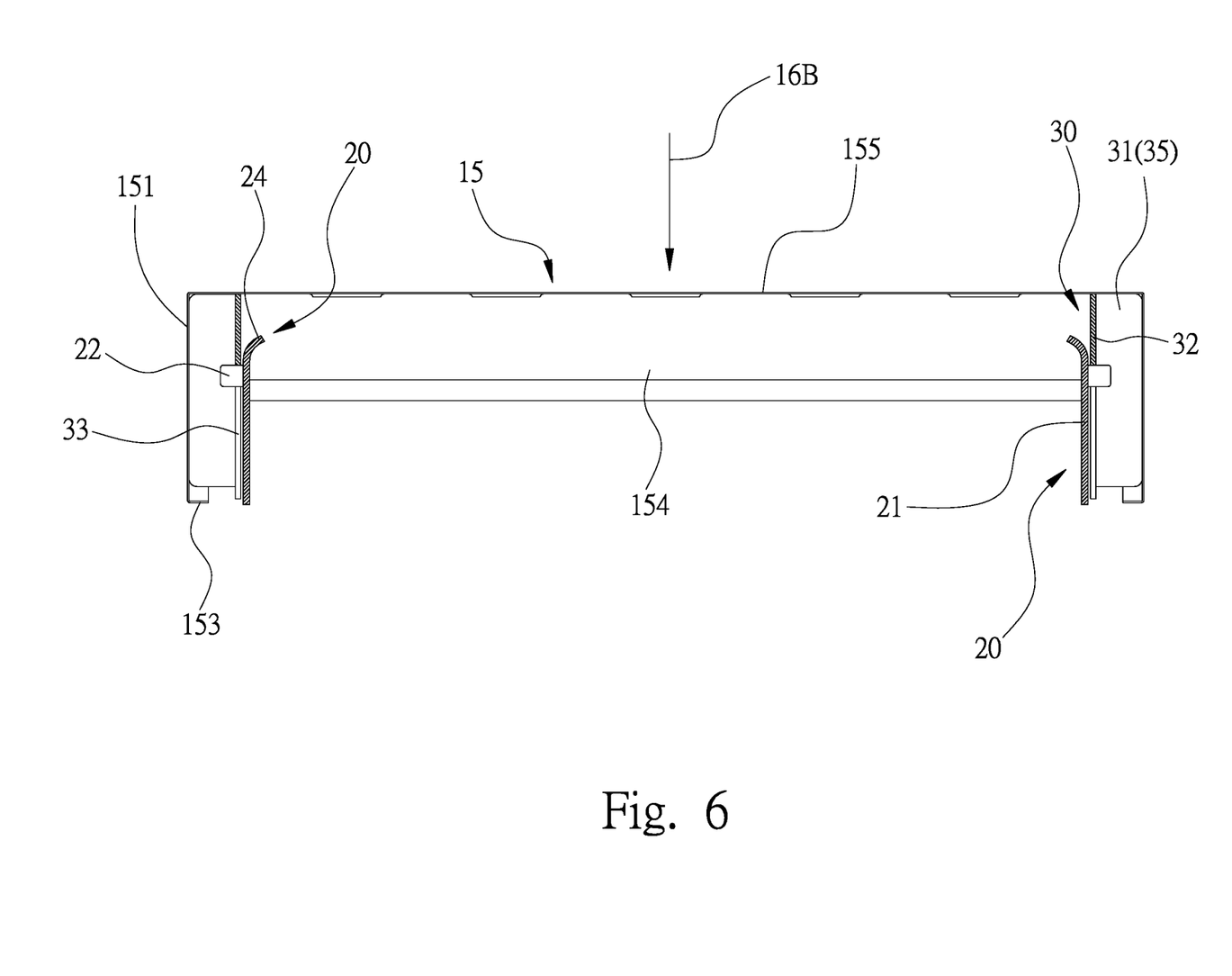
FIG. 6 is an enlarged partial view of the barbecue grill in another position than shown in FIG. 5.

Referring to FIGS. 5 and 6, to engage the sockets 31 with the brackets 21, a first, the platform 15 is located above the brackets 21. Then, the platform 15 is moved down toward the brackets 21 as indicated by an arrow head 16B. During the movement of the plat form 15, the latches 36 are pushed into the sockets 31 by the guiding strips 24 (FIG. 5). Moreover, the positioning rod 22 is engaged with the guiding slit 33 (FIG. 6) to guide the movement of the sockets 31 relative to the brackets 21.

Figure 7:
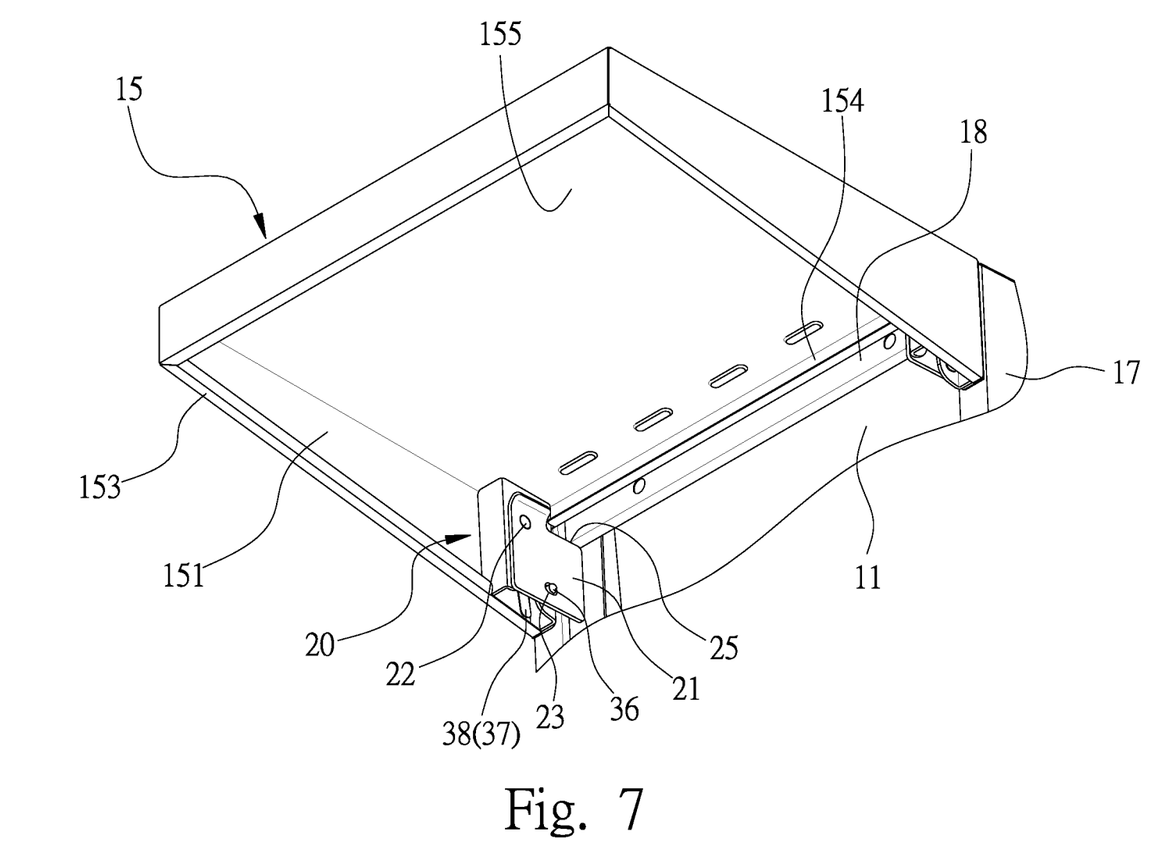
FIG. 7 is a perspective view of the barbecue grill shown in FIG. 6.

Referring to FIG. 7, the leaf springs 37 biases the latches 36 into the restraining apertures 23. That is, the couplers 30 are engaged with the brackets 21. Thus, the platform 15 is kept on the brackets 21. The internal skirt 154 is supported on the upper edges 25 of the brackets 21.

Referring to FIGS. 5 to 7, each of the positioning rods 22, the corresponding restraining aperture 23, the corresponding guiding slit 33 and the corresponding latch 36 together form an elastic locking mechanism 20. With the structurally simple elastic locking mechanisms 20, the platform 15 can easily be connected to the bowl 11, or the platform 15 can easily be detached from the bowl 11 by pushing the latches 36 out of the restraining apertures 23.

In another embodiment, the brackets 21, which include the positioning rods 22 and the restraining apertures 23, can be connected to the platform 15, and the couplers 30, which include the guiding slits 33 and the latches 36, can be connected to the bowl 11.

Figure 8:
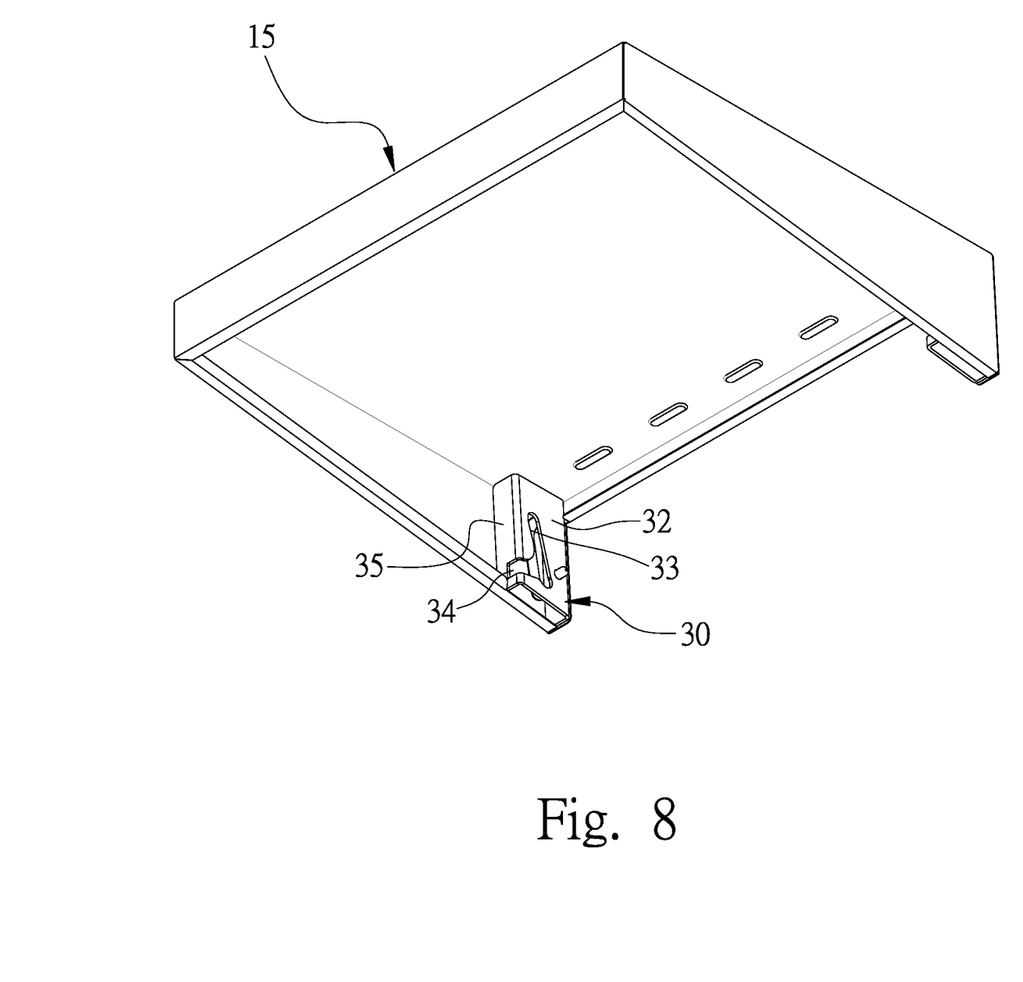
FIG. 8 is a perspective view of a detachable platform according to the second embodiment of the present invention.
Figure 9:
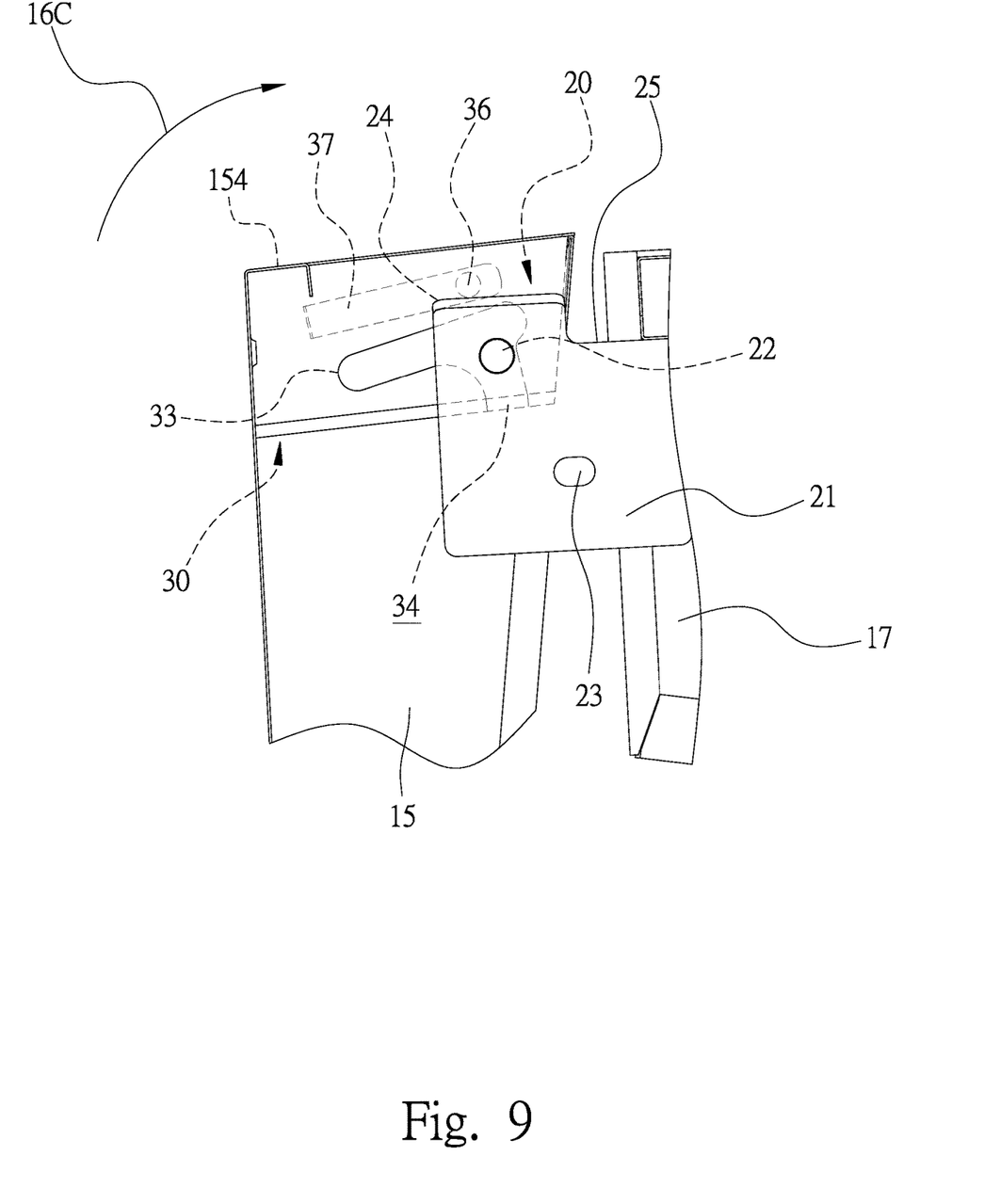
FIG. 9 is an enlarged partial view of the detachable platform shown in FIG. 8.
Figure 10:
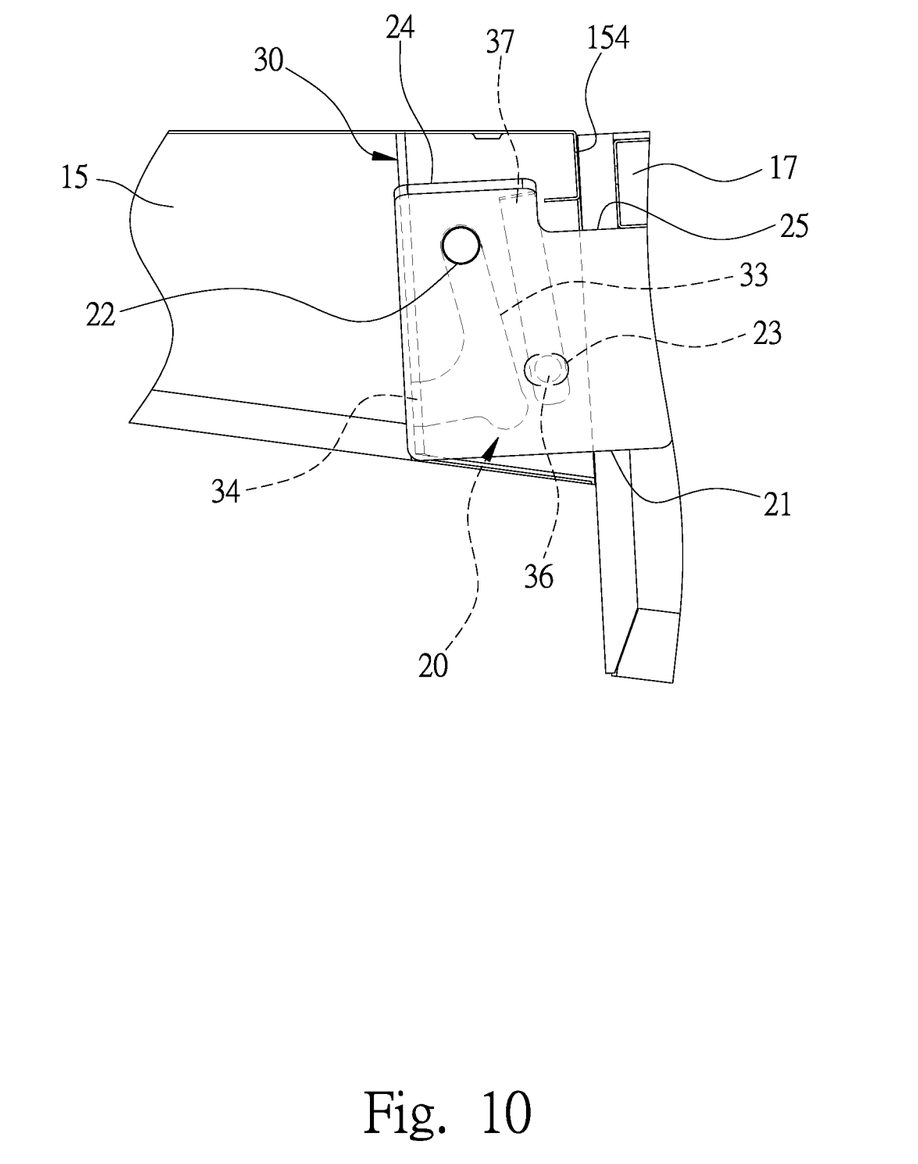
FIG. 10 is an enlarged view of the detachable platform in another position than shown in FIG. 9.

Referring to FIGS. 8 through 10, there is a platform 15 according to a second embodiment of the present invention. The second embodiment is identical to the first embodiment except that each of the guiding slits 33 is an L-shaped slit that includes a substantially vertical upper section and a substantially horizontal lower section. That is, there is an angle of about 90 degrees between the upper and lower sections. The upper section of each of the guiding slits 33 includes a closed end (not numbered). The lower section of each of the guiding slits 33 includes an open end 34. The open end 34 of each of the guiding slits 33 is located in one of the secondary portions 35 of the corresponding coupler 30.

To engage each coupler 30 with the corresponding bracket 21, at first, the board 155 of the platform 15 is located substantially vertically referring to FIG. 9. Now, the internal skirt 154 is located higher than the external skirt 154. Then, the platform 15 is lowered so that the positioning rod 22 is inserted in the lower section of the guiding slit 33 through the open end 34. The lowering of the platform 15 continues so that the positioning rod 22 reaches the upper section of the guiding slit 33.

Then, the platform 15 is pivoted as indicated by an arrow head 16C (FIG. 9) so that the board 155 of the platform 15 is located horizontally referring to FIG. 10. Then, the platform 15 is lowered so that the positioning rod 22 is moved in the guiding slit 33. The lowering of the platform 15 continues so that the positioning rod 22 reaches the closed end of the guiding slit 33. Finally, the latch 36 is inserted in the restraining aperture 23. Now, the internal skirt 154 is supported on the upper edge 25 of the bracket 21. Thus, platform 15 is connected to the bowl 11.

It should be noted that the positioning rod 22 is restrained by the primary portion 32 of the coupler 30 (FIG. 8) so that the platform 15 is not allowed to pivot about the latch 36. The latch 36 is restrained by the bracket 21 so that the platform 15 is not allowed to pivot about the positioning rod 22.

The present invention has been described via the illustration of the embodiments. Those skilled in the art can derive variations from the embodiments without departing from the scope of the present invention. Therefore, the embodiments shall not limit the scope of the present invention defined in the claims.

The invention claimed is:

1. A barbecue grill comprising:
   a bowl;
   a platform;
   a bracket connected to the bowl; and
   a coupler connected to the platform and used to engage with the bracket in a detachable manner;
   a guiding unit comprising:
      a positioning rod formed on the bracket; and
      a guiding slit made in the coupler, wherein the positioning rod is movable in the guiding slit; and
   a locking unit comprising:
      a restraining aperture made in the bracket; and
      a latch formed on the coupler and movable between an extended position and a withdrawn position, wherein in the extended position, the latch is insertable in the restraining aperture to engage the coupler with the bracket to keep the platform on the bowl.

2. The barbecue grill according to claim 1, wherein the locking unit comprises a leaf spring for biasing the latch to the extended position from the withdrawn position.

3. The barbecue grill according to claim 2, wherein the leaf spring is an arched element comprising two contact portions, with one contact portion in contact with the platform and the other contact portion connected to the latch.

4. The barbecue grill according to claim 3, the platform comprises a skirt in contact with one of the contact portions.

5. The barbecue grill according to claim 4, wherein the coupler comprises:
   a primary portion on which the positioning rod is formed and in which the guiding slit is made, wherein the latch is inserted in an aperture made in the primary portion; and two secondary portions connected to the skirt so that the primary portion, the secondary portions and the skirt together form a socket to contain the leaf spring.

6. The barbecue grill according to claim 1, wherein the bracket comprises:
- an upper edge for supporting the platform; and
- a guiding strip extending from the upper edge, and the latch is movable on the guiding strip so that the latch is movable to the withdrawn position from the extended position to allow the latch to move on the bracket until the latch reaches and extends into the restraining aperture.

7. The barbecue grill according to claim 6, wherein the guiding strip extends in an arc.

8. The barbecue grill according to claim 1, wherein the guiding slit comprises a closed end and an open end through which the positioning rod is inserted into the guiding slit.

9. The barbecue grill according to claim 8, wherein the guiding slit is a rectilinear slit extending vertically when the platform is located horizontal, and the open end of the guiding slit is located at a lower edge of the coupler.

10. The barbecue grill according to claim 8, wherein the guiding slit is a bent slit comprising an upper section extending substantially vertically and a lower section extending substantially horizontally when the platform is located horizontal, and the open end of the guiding slit is located at a lateral edge of the coupler.

\* \* \* \* \*